United States Patent
Nuhn

(10) Patent No.: US 10,694,661 B2
(45) Date of Patent: Jun. 30, 2020

(54) SELF-PROPELLED FILLING PIPE

(71) Applicant: Nuhn Industries Ltd., Sebringville (CA)

(72) Inventor: Ian Nuhn, Sebringville (CA)

(73) Assignee: NUHN INDUSTRIES LTD., Sebringville (CA)

( * ) Notice: Subject to any disclaimer, the term of this patent is extended or adjusted under 35 U.S.C. 154(b) by 214 days.

(21) Appl. No.: 15/966,054

(22) Filed: Apr. 30, 2018

(65) Prior Publication Data
US 2019/0327885 A1 Oct. 31, 2019

(51) Int. Cl.
*A01C 23/04* (2006.01)
*F16H 7/08* (2006.01)
*B60K 7/00* (2006.01)
*B62D 5/20* (2006.01)

(52) U.S. Cl.
CPC .......... *A01C 23/045* (2013.01); *B60K 7/0015* (2013.01); *B62D 5/20* (2013.01); *F16H 7/0827* (2013.01)

(58) Field of Classification Search
CPC .... A01C 23/045; A01C 23/04; B60K 7/0015; B62D 5/20
See application file for complete search history.

(56) References Cited

U.S. PATENT DOCUMENTS

| | | | | |
|---|---|---|---|---|
| 2,880,937 A | * | 4/1959 | King | A01G 25/097 239/737 |
| 2,942,677 A | * | 6/1960 | Gray | B60K 17/10 180/212 |
| 2,969,849 A | * | 1/1961 | Grant | A01D 46/20 182/2.11 |
| 2,970,667 A | * | 2/1961 | Bercaw | B66F 11/044 182/19 |
| 3,319,739 A | * | 5/1967 | Morse | A01D 46/20 182/2.3 |
| 3,379,279 A | * | 4/1968 | Slusher | B66F 11/044 182/14 |
| 3,501,059 A | * | 3/1970 | Van Der Lely | A01C 23/045 222/627 |
| 3,558,021 A | * | 1/1971 | Van Der Lely | A01C 23/045 222/483 |
| 3,905,725 A | * | 9/1975 | Johnson | A01C 3/04 417/231 |

(Continued)

*Primary Examiner* — Jacob D Knutson
*Assistant Examiner* — Michael R Stabley
(74) *Attorney, Agent, or Firm* — Brunet & Co. Ltd.; Robert Brunet; Hans Koenig

(57) ABSTRACT

A self-propelled filling pipe for a liquid manure spreader has a frame, an elongated pipe on the frame having a lower inlet end and an elevated outlet end, at least two wheels mounted on the frame, a caster wheel mounted on the elongated pipe proximate the lower inlet end and a fluid drive system. The fluid drive system includes a hydraulic pump, a first hydraulic circuit connecting the hydraulic pump to a plurality of hydraulic motors drivingly connected to the wheels. The fluid drive system also includes a second hydraulic circuit connecting the hydraulic pump to a hydraulic motor operatively connected to the caster wheel. A prime mover provides power to the hydraulic pump to power the hydraulic motors to rotate the caster wheel thereby steering the filling pipe and/or to drive the wheels thereby propelling the filling pipe on the ground.

15 Claims, 6 Drawing Sheets

(56) References Cited

U.S. PATENT DOCUMENTS

| | | | | | |
|---|---|---|---|---|---|
| 3,910,722 | A | * | 10/1975 | Hochmuth | F04D 29/605 417/34 |
| 4,000,787 | A | * | 1/1977 | Groenig | B66F 11/044 182/2.7 |
| 4,169,511 | A | * | 10/1979 | Brown | B66F 11/044 180/212 |
| 4,284,371 | A | * | 8/1981 | Paulson | A01C 3/02 406/107 |
| 4,369,855 | A | * | 1/1983 | Buschbom | B60K 17/10 180/212 |
| 4,441,824 | A | * | 4/1984 | Brokaw | A01C 3/026 366/266 |
| 4,456,039 | A | * | 6/1984 | van der Lely | A01C 23/045 141/231 |
| 4,514,978 | A | * | 5/1985 | Buschbom | B60K 7/0015 60/420 |
| 4,986,387 | A | * | 1/1991 | Thompson | B62D 7/142 180/212 |
| 5,100,303 | A | * | 3/1992 | Depault | A01C 3/026 366/266 |
| 5,564,522 | A | * | 10/1996 | Markin | B66F 11/044 182/2.7 |
| 5,624,241 | A | * | 4/1997 | Nesseth | A01C 3/026 417/234 |
| 8,939,637 | B2 | * | 1/2015 | Depault | F04B 15/02 366/270 |
| 9,381,527 | B2 | * | 7/2016 | Mitchell | A01C 23/04 |

* cited by examiner

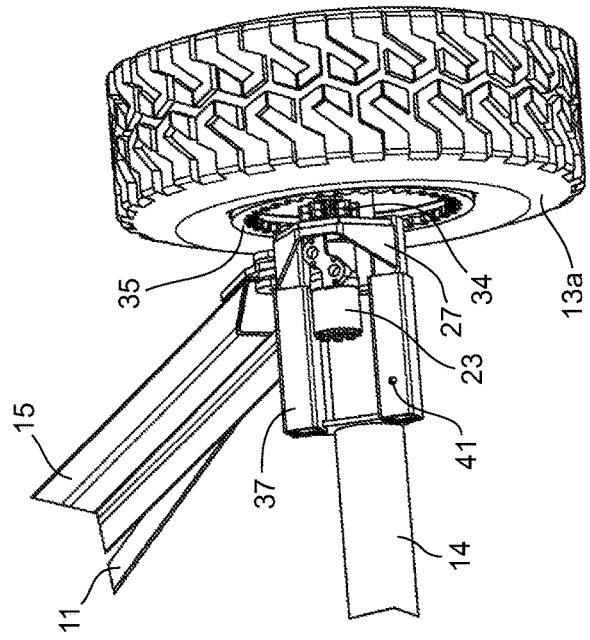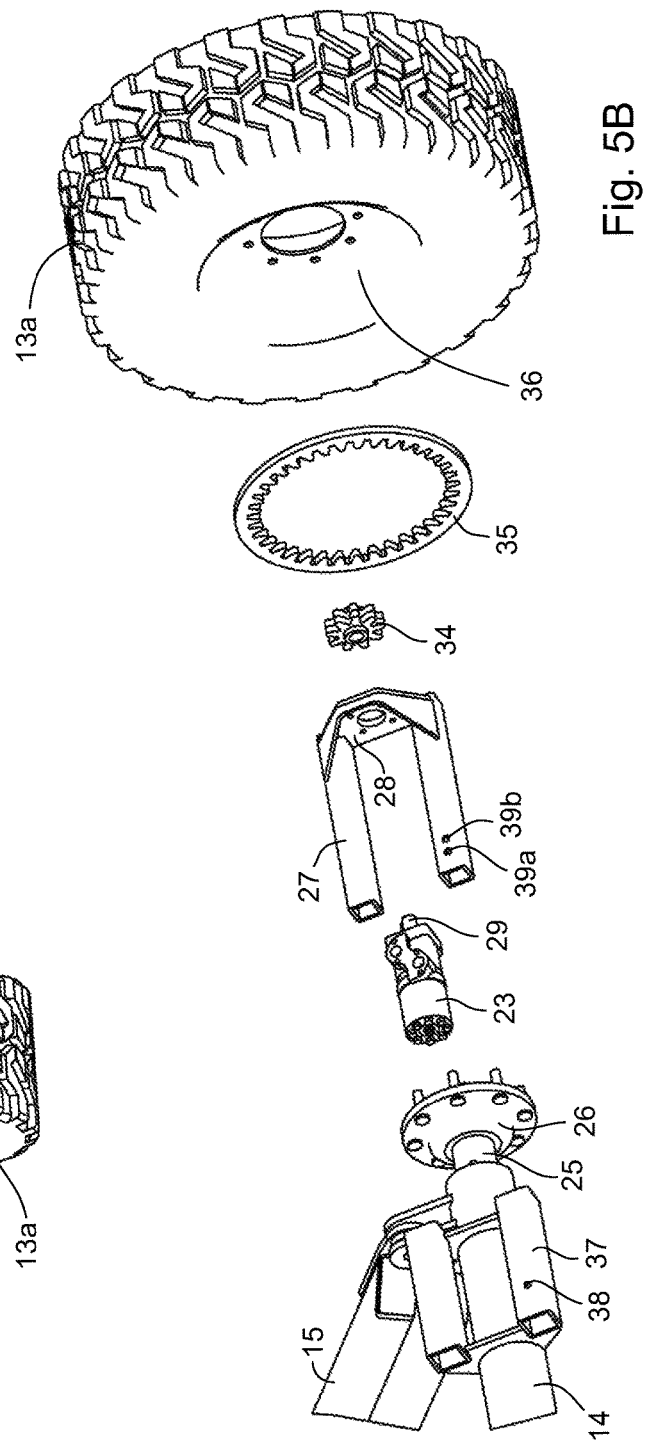

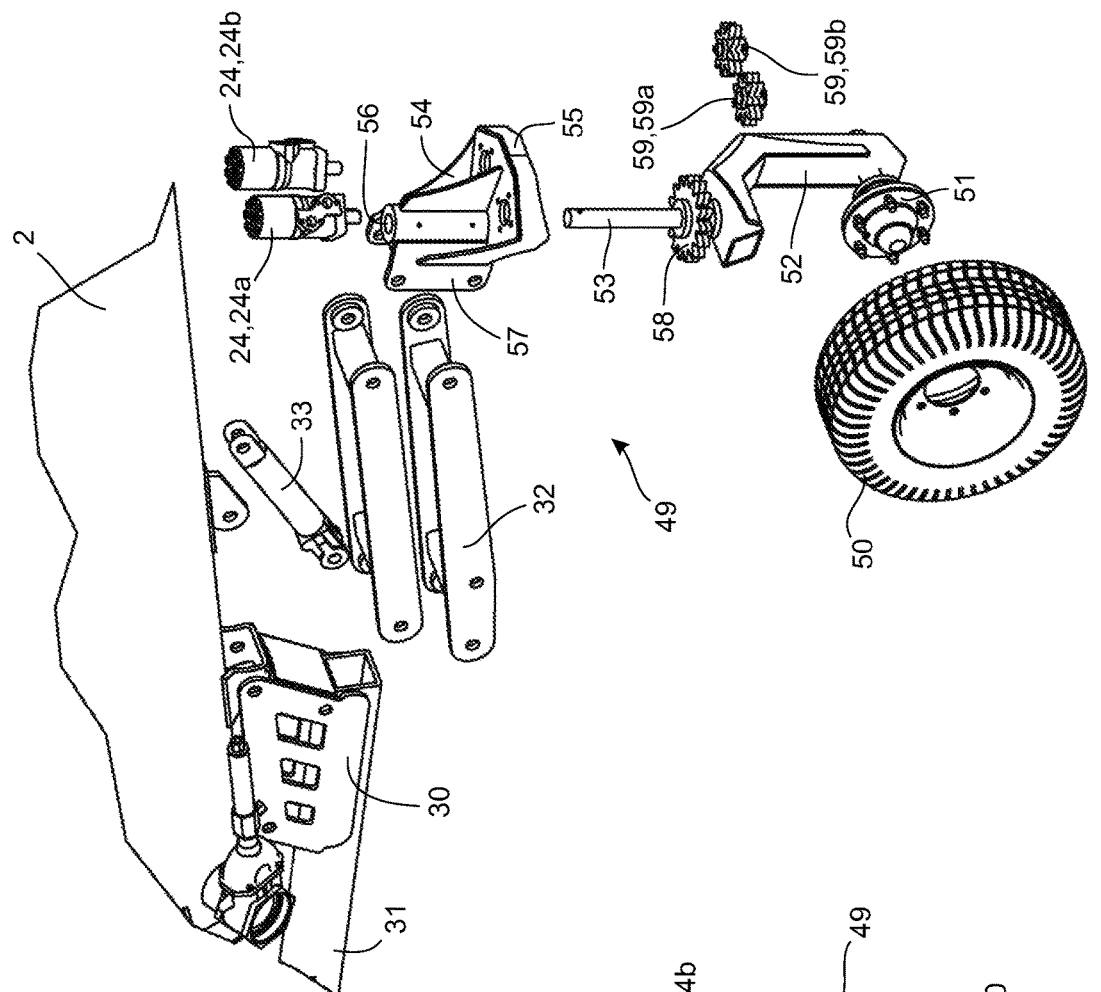
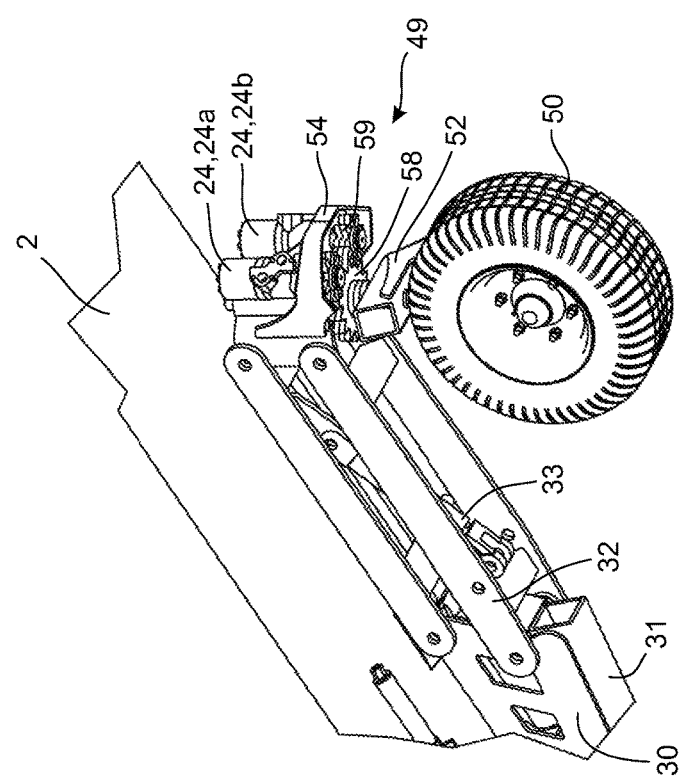
Fig. 6B
Fig. 6A

SELF-PROPELLED FILLING PIPE

FIELD

This application relates to filling pipes, especially for use in top-loading liquid conveyance vehicles, for example liquid manure spreaders.

BACKGROUND

Transferring liquid manure from a manure pond to a tank of a liquid manure spreader involves pumping the liquid manure from the pond through a filling pipe into the tank of the spreader. Because the tank is loaded from the top, the filling pipe is generally mounted on a wheeled A-frame with the pipe inclined from a lower inlet end to an elevated outlet end. The lower inlet end is equipped with a fluid connection structure for connecting the inlet end to an outlet of a liquid manure pump located in the pond. The A-frame is generally equipped with a scissor linkage that can be manually adjusted to raise and lower the elevated outlet end of the pipe. The wheels on the A-frame allow the filling pipe to be moved manually on the ground to properly position the filling pipe between the pond and the manure spreader.

Modern liquid manure pumps are able to move large volumes of liquid manure quickly, requiring larger diameter filling pipes to accommodate the increased volumes. The larger diameter filling pipes are heavier and cannot be moved readily by hand. These heavier filling pipes are towed behind a vehicle between farms, but at a farm the heavier filling pipes are difficult to position properly into the exact desired location at the farm.

There is a need in the art for being able to more easily position and operate heavy filling pipes.

SUMMARY

In one aspect, there is provided a self-propelled filling pipe for a liquid manure spreader, the self-propelled filling pipe comprising: a frame; an elongated pipe having a lower inlet end and an elevated outlet end, the elongated pipe mounted on the frame; a plurality of wheels mounted on the frame, the plurality of wheels facilitating movement of the pipe on a ground surface; a fluid drive system comprising a hydraulic pump, a hydraulic circuit connected to the hydraulic pump, the hydraulic circuit comprising a hydraulic fluid reservoir and hydraulic fluid conduits, and a plurality of hydraulic motors connected to the hydraulic circuit and drivingly connected to the plurality of wheels; and, a prime mover for providing power to the hydraulic pump to power the hydraulic motors to drive the plurality of wheels to propel the filling pipe on the ground surface.

In another aspect, there is provided a self-propelled filling pipe for a liquid manure spreader, the self-propelled filling pipe comprising: a frame; an elongated pipe having a lower inlet end and an elevated outlet end, the elongated pipe mounted on the frame; at least two wheels mounted on the frame, the at least two wheels facilitating movement of the pipe on a ground surface; a caster wheel mounted on the elongated pipe proximate the lower inlet end; a fluid drive system comprising a hydraulic pump, a first hydraulic circuit connected to the hydraulic pump and a plurality of first hydraulic motors drivingly connected to the at least two wheels; a second hydraulic circuit connected to the hydraulic pump and at least one second hydraulic motor operatively connected to the caster wheel; and, a prime mover for providing power to the hydraulic pump to power the first and second hydraulic motors to: rotate the caster wheel thereby steering the filling pipe; and/or, drive the at least two wheels thereby propelling the filling pipe on the ground surface.

The fluid drive system is relatively inexpensive and simple to mount on the frame. Further, the use of a hydraulic motor for each wheel eliminates the need for an axle or shaft connecting the wheels to a single prime mover. Furthermore, the fluid drive system permits steering without providing additional dedicated steering structure or additional types of steering controls (e.g. steering wheels), Additionally, the fluid drive system permits the use of a simple disengagement structure by virtue of the hydraulic motors being connected to the hydraulic pump by flexible fluid conduits, and permits the drive system to also be used to raise and lower the outlet end and/or inlet end of the elongated pipe by simple linkage mechanisms.

In an embodiment, the first hydraulic motors may be independently controllable to independently drive each of the at least two wheels. Independent control of the at least two wheels allows the filling pipe to be steerable by differentially controlling the speed of the at least two wheels. In a preferred embodiment, the at least two wheels is two wheels and the plurality of first hydraulic motors is two hydraulic wheel motors, one hydraulic wheel motor for each of the two wheels.

In an embodiment, the plurality of first hydraulic motors may comprise disengagement structures for mechanically disengaging the plurality of first hydraulic motors from the at least two wheels. In a preferred embodiment, the plurality of first hydraulic motors comprise wheel output gears, the at least two wheels comprise wheel input gears connected to the at least two wheels, the wheel input gears having a larger diameter than the wheel output gears, the wheel output and wheel input gears meshing to drivingly connect the plurality of first hydraulic motors to the at least two wheels, and the disengagement structures comprise slides attached to the plurality of first hydraulic motors, the slides translatable along portions of the frame to disengage the wheel output gears from the wheel input gears, the slides reversibly securable to the frame portions to secure the wheel output gears in an engaged position or a disengaged position. In another preferred embodiment, the plurality of first hydraulic motors comprise wheel output pulleys or sprockets, the at least two wheels comprise wheel input pulleys or sprockets connected to the at least two wheels, the wheel input pulleys or sprockets having a larger diameter than the wheel output pulleys or sprockets, the wheel output pulleys or sprockets and wheel input pulleys or sprockets connected by belts or chains to drivingly connect the plurality of first hydraulic motors to the at least two wheels, and the disengagement structures comprise mechanical clutches. The mechanical clutches may comprise, for example, over-center cams and levers for moving idler pulleys or sprockets into our out of engagement with the belts or chains to thereby tension or slacken the belts or chains to drivingly engage or disengage the plurality of first hydraulic motors from the at least two wheels.

In an embodiment, the drive system may comprise a third hydraulic circuit connected to the hydraulic pump and at least one hydraulic cylinder, whereby operating the at least one hydraulic cylinder raises and lowers the outlet end of the elongated pipe. In a preferred embodiment, the at least one hydraulic cylinder may comprise at least two hydraulic cylinders, at least one of the hydraulic cylinders operable to raise and lower the outlet end of the elongated pipe and at least one of the hydraulic cylinders operable to raise and lower the inlet end of the elongated pipe.

In an embodiment, the frame may comprise at least one scissor linkage, and the at least one hydraulic cylinder may be mounted on the at least one scissor linkage. Operating the at least one hydraulic cylinder drives the at least one scissor linkage to raise and lower the outlet end of the elongated pipe. In a preferred embodiment, the at least one scissor linkage may be two scissor linkages, and the at least one hydraulic cylinder may be two hydraulic cylinders, one hydraulic cylinder for each of the two scissor linkages.

In an embodiment, the self-propelled filling pipe may further comprise a mounting bracket attached to the elongated pipe proximate the lower inlet end. The caster wheel may be mounted on the mounting bracket by a pivotable linkage assembly. The hydraulic cylinder operable to raise and lower the inlet end of the elongated pipe may be pivotally connected to the mounting bracket and the linkage assembly. Operation of the hydraulic cylinder pivots the linkage assembly on the bracket to raise and lower the lower inlet end when the caster wheel is on the ground surface.

In an embodiment, the caster wheel may comprise a vertical shaft rotatably connecting the caster wheel proximate the lower inlet end of the elongated pipe and a caster input gear mounted on the vertical shaft. The at least one second hydraulic motor may comprise a caster output gear meshing with the caster input gear to rotate the caster wheel on operation of the second hydraulic motor thereby steering the filling pipe.

In an embodiment, the self-propelled filling pipe may further comprise a control unit for controlling the drive system. The control unit may be mounted on the self-propelled filling pipe, or located remotely communicating wirelessly with the prime mover and/or drive system. The control unit may comprise input for giving commands to the prime mover and/or drive system, and output devices for monitoring status of the prime mover and/or drive system. The control unit may comprise only simple electrical circuits, or may comprise a programmable logic circuit (PLC).

The prime mover may comprise any suitable device to provide power to the hydraulic pump, for example a combustion engine, an electric motor, and the like. The prime mover may be mounted on the frame, or located remotely, for example on a towing vehicle.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 5A is a magnified view of an individual wheel assembly of a pair of forward wheels of the self-propelled filling pipe of FIG. 1;

FIG. 5B is an exploded view of the wheel assembly of FIG. 5A;

FIG. 6A is a magnified view of a caster wheel assembly at the lower inlet end of the self-propelled filling pipe of FIG. 1; and, FIG. 6B is an exploded view of the caster wheel assembly of FIG. 6A.

DETAILED DESCRIPTION

Figure 1:
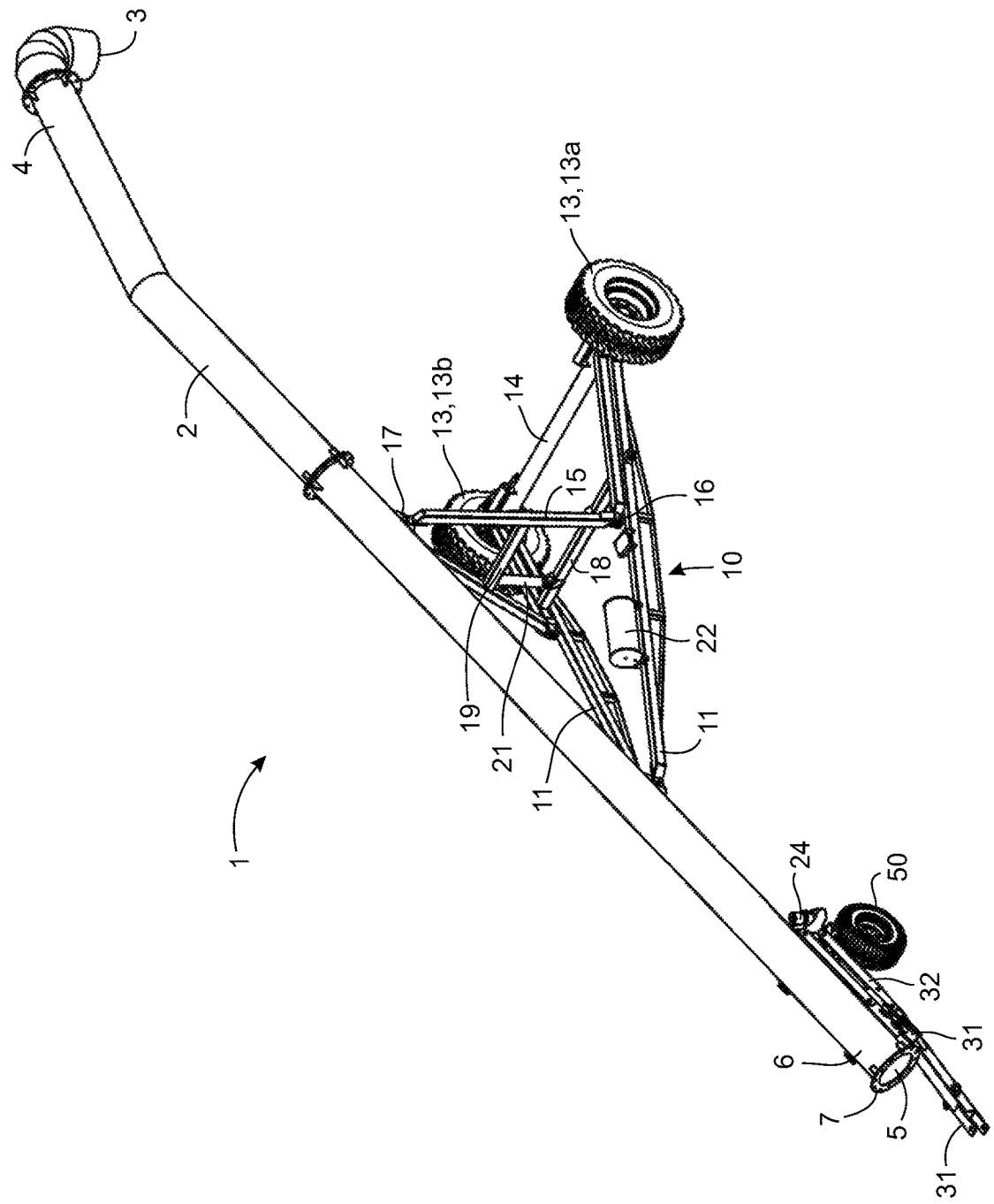
FIG. 1 is a first perspective view of a self-propelled filling pipe of the present invention.

With reference to the Figures, a self-propelled filling pipe 1 comprises an elongated pipe 2 having an outlet 3 at an elevated outlet end 4 and an inlet 5 at a lower inlet end 6. The elongated pipe 2 is mounted on a frame 10, for example an A-frame as shown most clearly in FIG. 2, although any suitable frame may be employed. The frame 10 is preferably located proximate a center of gravity of the elongated pipe 2, for example in a middle section of the elongated pipe 2, so that the elongated pipe 2 is generally balanced on the frame 10. The elongated pipe 2 is generally inclined upwardly from the lower inlet end 6 to the elevated outlet end 4. The inlet 5 is equipped with a fluid connection structure 7, for example an annular flange with bolt holes, for connecting the lower inlet end 6 of the elongated pipe 2 to an outlet of a liquid manure pump (not shown) located in the pond. Liquid manure is pumped from the pond into the inlet 5 up the elongated pipe 2 and out of the outlet 3 into a tank of a liquid manure spreader (not shown).

The frame 10 comprises a pair of longitudinal elongated frame members 11 extending longitudinally forward from a first common mounting tab 12 on the elongated pipe 2 to a pair of wheels 13, individually identified as 13a and 13b. A transverse elongated frame member 14 extends transversely between forward ends of the longitudinal elongated frame members 11 connecting the forward ends of the longitudinal elongated frame members 11. The longitudinal elongated frame members 11 and the transverse elongated frame member 14 form a triangular frame with apexes proximate the first common mounting tab 12 and the two wheels 13. The wheels 13 are independently rotatably mounted on the transverse elongated frame member 14 so that rotation of the wheel 13a is independent of rotation of the wheel 13b. However, in some embodiments, the transverse elongated frame member may serve as a common rotatable axle with both wheels 13 rigidly mounted on the axle. Other arrangements of frame members may be utilized.

Figure 4A:
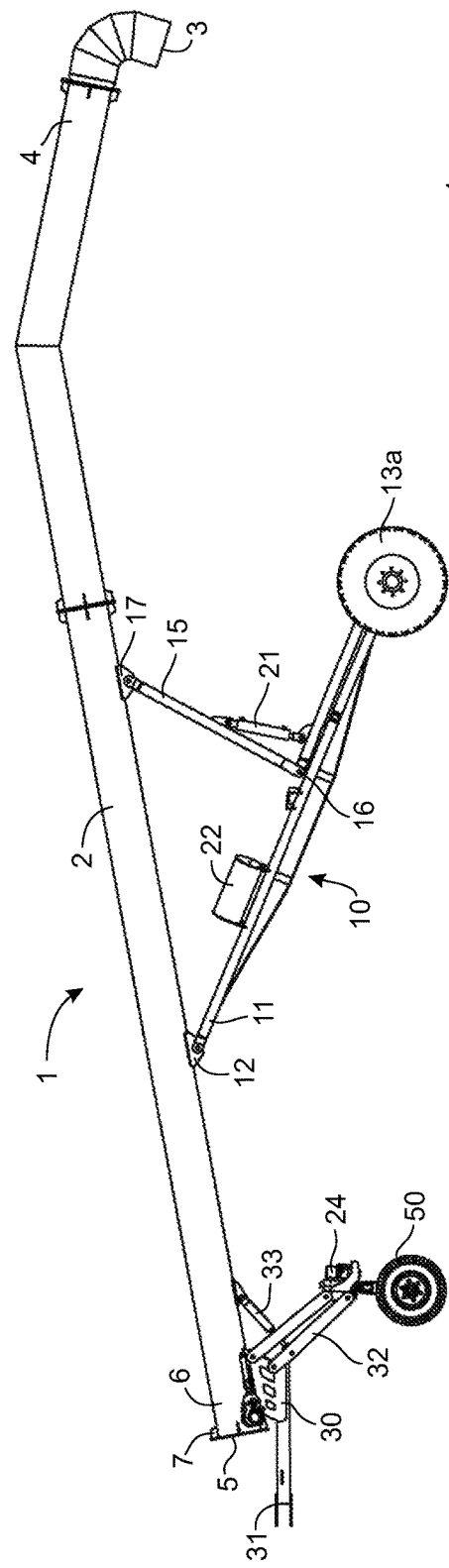
FIG. 4A is a side view of the self-propelled filling pipe of FIG. 1 with a lower inlet end of the filling pipe in a raised position.
Figure 4B:
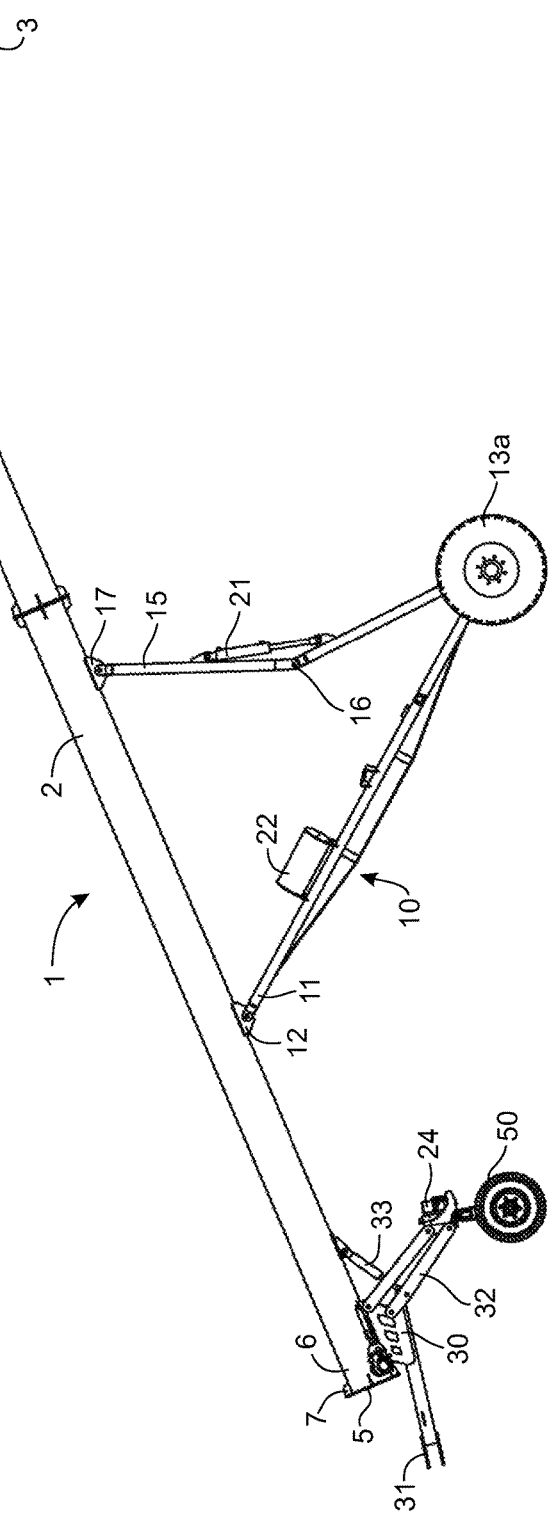
FIG. 4B shows the self-propelled filling pipe of FIG. 4A with an elevated outlet end of the filling pipe in a raised position.

The frame 10 further comprises a pair of scissor linkages 15, each of the scissor linkages 15 having upper and lower linkage members pivotally connected together at a pivot point 16. Upper ends of the upper linkage members are pivotally connected to a second common mounting tab 17 on the elongated pipe 2 located longitudinally forward from the first common mounting tab 12 on the elongated pipe 2. Lower ends of the lower linkage members are pivotally connected to the transverse elongated frame member 14. A first transverse scissor linkage support bar 18 extends transversely between the lower linkage members of the scissor linkages 15, and a second transverse scissor linkage support bar 19 extends transversely between the upper linkage members of the scissor linkages 15. A pair of scissor linkage hydraulic cylinders 21 connect the first and second transverse scissor linkage support bars 18, 19. Actuation of the scissor linkage hydraulic cylinders 21 causes the scissor linkages 15 to expand and contract thereby raising and lowering the elevated outlet end 4 of the elongated pipe 2, as seen in FIG. 4A and FIG. 4B. Any number of hydraulic cylinders could be used. The hydraulic cylinders could be replaced with any other kind of actuator, for example linear actuators, mechanical actuators and the like, but hydraulic cylinders are preferred utilizing a common hydraulic circuit as described below.

The elongated pipe 2 is also mounted on a bracket 30 proximate the lower inlet end 6 of the elongated pipe 2. The bracket 30 forms one link in a quadrilateral linkage mechanism 32 on which a caster wheel 50 is rotatably mounted. A caster wheel hydraulic cylinder 33 is mounted between lower and upper pivotable arms of the quadrilateral linkage mechanism 32. Operation of the caster wheel hydraulic cylinder 33 raises and lowers the lower inlet end 6 while the caster wheel 50 rests on the ground. While a quadrilateral linkage mechanism is illustrated, and suitable mechanism for raising and lowering the lower end of the elongated pipe relative to the caster wheel can be used. A hitch 31 is attached to the bracket 30 and protrudes longitudinally rearward from the lower inlet end 6. The hitch 31 may be linked to a towing vehicle for transporting the filling pipe 1 between distant locations, for example from farm-to-farm. FIG. 3B depicts the filling pipe 1 in a configuration for towing where the caster wheel 50 is off the ground and the hitch 31 is essentially parallel to the ground.

Figure 2:
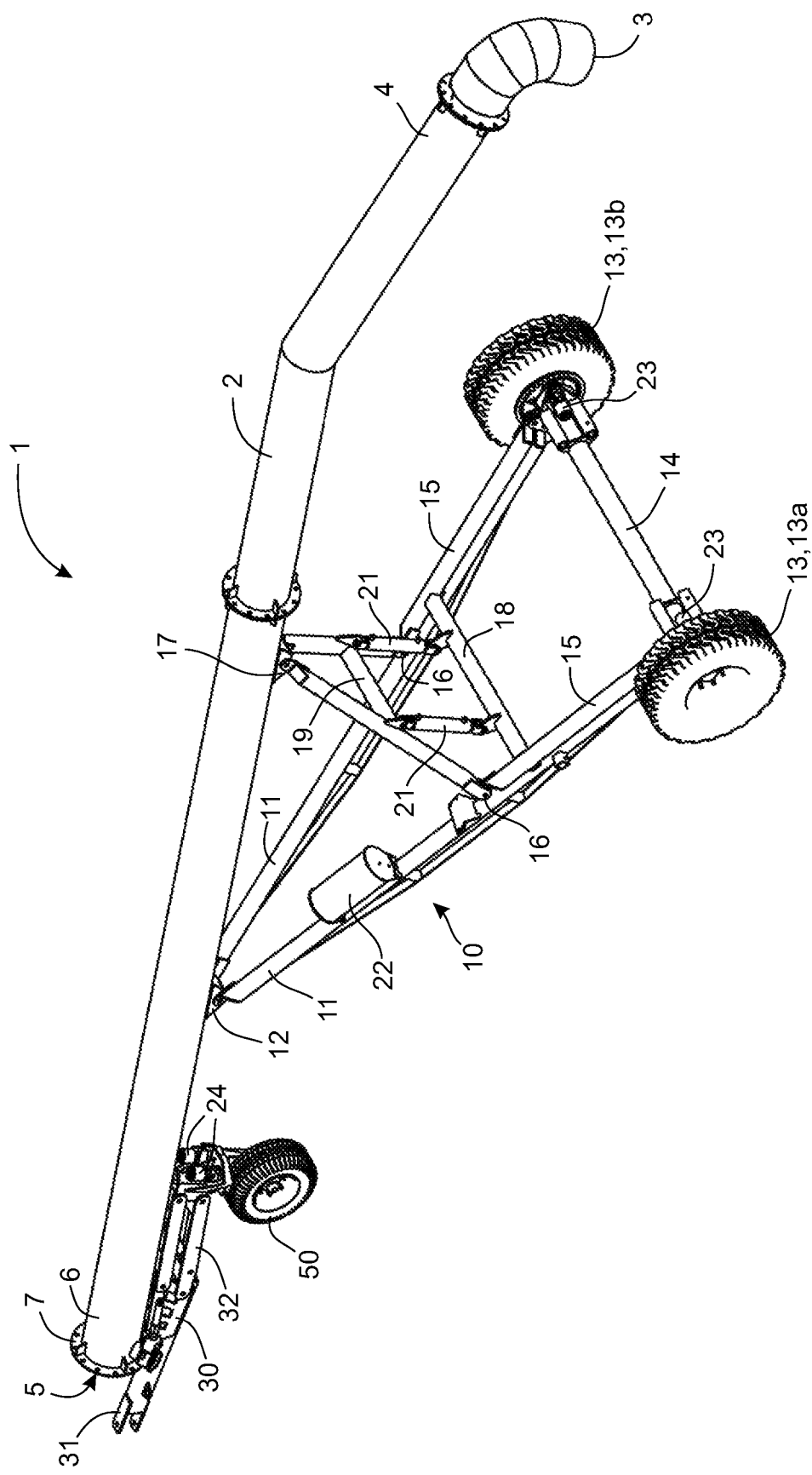
FIG. 2 is a second perspective view of the self-propelled filling pipe of FIG. 1.
Figure 3A:
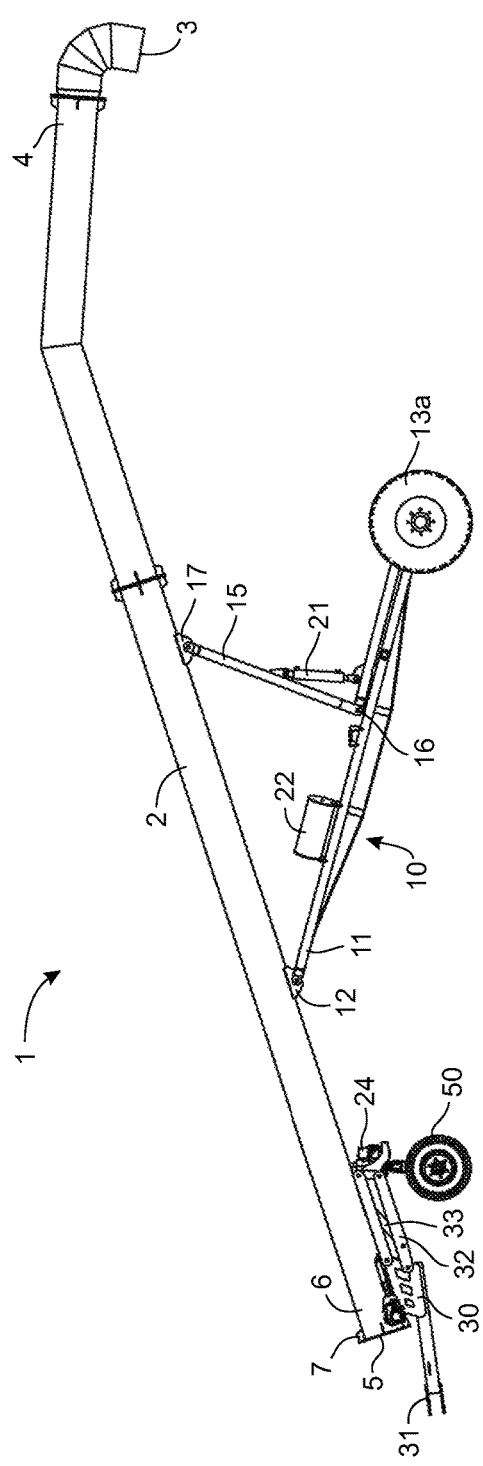
FIG. 3A is a side view of the self-propelled filling pipe of FIG. 1.
Figure 3B:
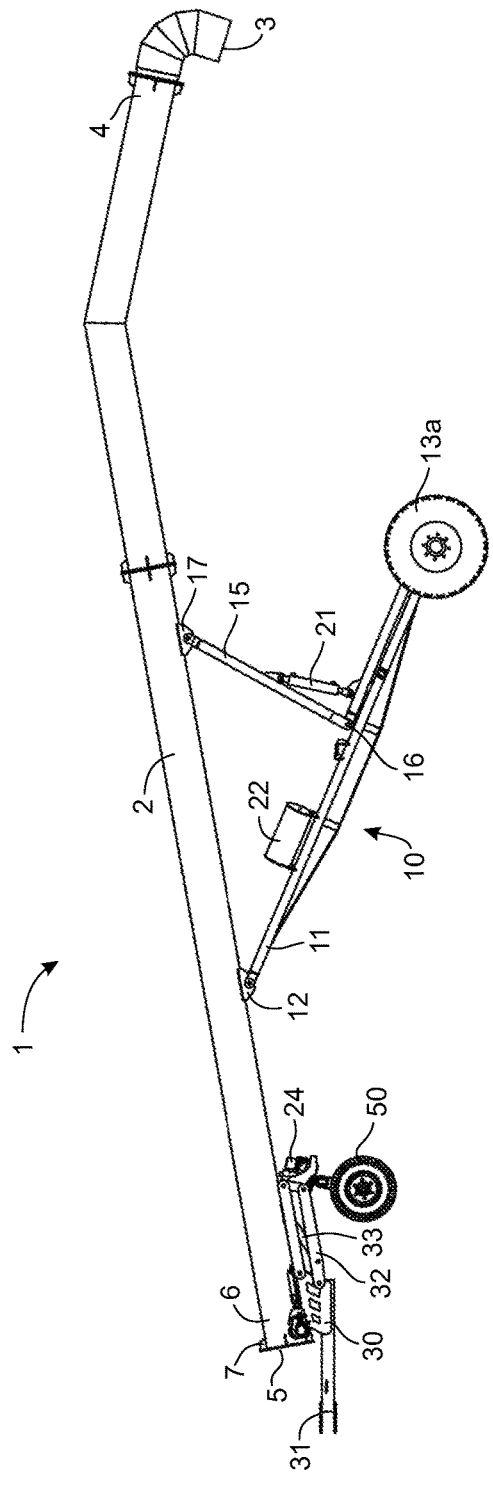
FIG. 3B shows the self-propelled filling pipe of FIG. 3A oriented when hitched to a towing vehicle.

FIG. 1, FIG. 2 and FIG. 3A depict the filling pipe 1 in a storage position with the quadrilateral linkage mechanism 32 and the scissor linkages 15 in the collapsed position. FIG. 3B is the same configuration as FIG. 3A except that the hitch 31 has been raised off the ground to be connected to a towing vehicle for towing, resulting in the elongated pipe 2 assuming a more horizontal orientation and the caster wheel 50 being raised off the ground so that the filling pipe 1 only rides on the wheels 13. As discussed below, when the filling pipe 1 is to be towed, the wheels 13 are disengaged from a hydraulic drive system that drives the wheels 13 to prevent back-driving of the hydraulic drive system.

To place the filling pipe 1 in an operational configuration, the lower inlet end 6 may be raised, as shown in FIG. 4A, by actuating the caster wheel hydraulic cylinder 33 using the hydraulic drive system. The elevated outlet end 4 may be raised, as shown in FIG. 4B, to a desired height depending on the height of the tank on the manure spreader by actuating the scissor linkage hydraulic cylinders 21 using the hydraulic drive system. The filling pipe 1 may then be moved into a desired position to correctly orient the inlet 5 to be connected to the outlet of the pump, and to correctly position the outlet 3 over the inlet of the tank on the manure spreader. The hydraulic drive system may also be utilized to drive the filling pipe 1 into the desired position. Operation of the hydraulic drive system is discussed below.

The hydraulic drive system comprises a common hydraulic pump 22, individual first hydraulic motors 23 connected to each of the wheels 13, two second hydraulic motors 24 connected to the caster wheel 50, the scissor linkage hydraulic cylinders 21, the caster wheel hydraulic cylinder 33 and hydraulic lines (not shown for clarity) for fluidly connecting components of the hydraulic drive system. The hydraulic pump 22 is conveniently mounted on the frame 10 close to a common gasoline engine 40, which is also mounted on the frame 10 and which powers the hydraulic pump 22. Any prime mover, for example an electric motor, a diesel engine and the like may be used instead of the gasoline engine. The prime mover and/or hydraulic pump may be mounted elsewhere other than on the frame, if desired, for example on a towing vehicle.

The wheels 13 may be driven by the hydraulic drive system so that the the filling pipe 1 is self-propelled. The wheels 13 (13a, 13b) may be independently driven by the hydraulic drive system. FIG. 5A and FIG. 5B show how the wheel 13a is mounted on the filling pipe 1 and driven by the hydraulic drive system. The same description applies to the wheel 13b. The wheel 13a is rotatably mounted on the transverse elongated frame member 14 though a wheel hub 26 rigidly mounted on a stub axle 25, the stub axle 25 rotatably mounted in the transverse elongated frame member 14 at an end thereof. A rim 36 of the wheel 13a is secured by lug nuts to bolts on the hub 26, and the stub axle 25 is mounted on one or more bearings within a hollow portion of the transverse elongated frame member 14 to permit the wheel 13a to roll when the filling pipe 1 is moving.

The hydraulic motor 23 is securely mounted on a face plate 28 of a slider 27, a drive shaft 29 of the hydraulic motor 23 extending through an aperture in the face plate 28 when the hydraulic motor 23 is mounted on a face plate 28. A receiver 37 for the slider 27 is securely mounted on the transverse elongated frame member 14, the receiver 37 adapted to receive the slider 27 and to permit the slider 27 to slide transversely thereon. In the illustrated embodiment, the slider 27 comprises tubular legs, which are received by corresponding larger diameter tubular legs of the receiver 37. The slider 27 may be reversibly secured to the receiver 37 to prevent movement of the slider 27 by aligning one of two pin apertures 39a, 39b on the slider 27 with a corresponding pin aperture 38 on the receiver 37, and securing the slider 27 to the receiver 37 with a pin 41. The receiver 37 and the slider 27 are mounted on the transverse elongated frame member 14 in a manner that does not interfere with mounting the rim 36 of the wheel 13a on the hub 26.

A small diameter spur gear 34 is mounted on the drive shaft 29 so that the face plate 28 is between a body of the hydraulic motor 23 and the spur gear 34. An internal gear 35 having a larger diameter than the spur gear 34 is securely mounted inside the rim 36 of the wheel 13a. When the slider 27 is mounted on the receiver 37 with the pin 41 through the pin apertures 38 and 39a, the spur gear 34 is positioned sufficiently outward transversely that teeth of the spur gear 34 mesh with teeth of the internal gear 35. Therefore, operation of the hydraulic motor 23 can drive the spur gear 34 thereby driving the internal gear 35 thus driving the wheel 13a. Because the spur gear 34 has a smaller diameter than the internal gear 35, the wheel 13a experiences increased torque and lower speed compared to the torque and speed of the drive shaft 29 of the hydraulic motor 23. The hydraulic motor 23 is able to drive the wheel 13a forward and backward at infinitely variable speeds.

The spur gear 34 may be disengaged from the internal gear 35 by removing the pin 41 from the pin apertures 38 and 39a, sliding the slider 27 transversely inwardly to align the pin apertures 38 and 39b, and inserting the pin 41 through the pin apertures 38 and 39b. Sliding the slider 27 transversely inwardly causes the spur gear 34 to move transversely inwardly as well, which disengages the teeth of spur gear 34 from teeth of the internal gear 35. With the spur gear 34 disengaged from the internal gear 35, the filling pipe 1 may be towed by a towing vehicle without back-driving the hydraulic motor 23.

Because the two wheels 13a, 13b are driven independently by individual hydraulic motors 23, the self-propelled filling pipe 1 may be steered by by differentially controlling the speed of the individual hydraulic motors 23 to differentially control the speed of the two wheels 13*a*, 13*b*.

The hydraulic drive system may also be used to operate the caster wheel 50, as depicted in FIG. 6A and FIG. 6B. Operation of the caster wheel 50 permits an alternative steering function for the self-propelled filling pipe 1. In a caster assembly 49, the caster wheel 50 is securely mounted on a caster wheel hub 51, the caster wheel hub 51 rotatably mounted on an upwardly-oriented horn 52, for example via a stub axle mounted on a bearing mounted in the horn 52. A cylindrical stem 53 is mounted securely on the horn 52 and extends upwardly from the horn 52 into a cylindrical bore 56 of a caster mount 54, the stem 53 rotatably secured in the cylindrical bore 56 by any suitable means, for example a cotter pin, a pressure fitting and the like. The caster mount 54 comprises a caster assembly mounting bracket 57, the caster assembly mounting bracket 57 pivotably mounted on the quadrilateral linkage mechanism 32 to mount the caster assembly 49 on the filling pipe 1. The caster assembly mounting bracket 57 forms one link in the quadrilateral linkage mechanism 32.

The caster assembly 49 further comprises a main caster spur gear 58 securely mounted on the stem 53 between the horn 52 and a lower face 55 of the caster mount 54. The second hydraulic motors 24, individually identified as 24*a* and 24*b*, are mounted on an upper surface of the lower face 55 with drive shafts of the second hydraulic motors 24 extending through apertures in the lower face 55. Second hydraulic motor spur gears 59, individually identified as 59*a* and 59*b*, are mounted on the drive shafts of the second hydraulic motors 24*a* and 24*b*, respectively, below the lower face 55 of the caster mount 54 and above the horn 52. The second hydraulic motors 24 are positioned so that teeth of the second hydraulic motor spur gears 59 mesh with teeth of the main caster spur gear 58. Operation of the second hydraulic motors 24 rotates the second hydraulic motor spur gears 59, which rotate the main caster spur gear 58, which in turn rotates the cylindrical stem 53 within the cylindrical bore 56, thereby rotating the caster wheel 50 about a rotation axis oriented longitudinally through a central longitudinal axis of the cylindrical stem 53. Rotation of the caster wheel 50 in this manner changes the horizontal direction in which the caster wheel 50 points, which permits steering of the self-propelled filling pipe 1 when, as seen in FIG. 4A and FIG. 4B, the caster wheel 50 is on the ground and the quadrilateral linkage mechanism 32 is expanded to raise the lower inlet end 6 of the filling pipe 1 so that the hitch 31 is off the ground.

The second hydraulic motors 24 may both drive the second hydraulic motor spur gears 59 in the same direction for added power to drive rotation of the caster wheel 50 while the caster wheel 50 is on the ground. The hydraulic motors 24 may be driven in reverse to reverse the angular direction of rotation of the caster wheel 50. One or more than two second hydraulic motors may be utilized if desired, depending on the strength of the hydraulic motors.

The self-propelled filling pipe 1 comprises a single hydraulic drive system comprising one hydraulic pump 22 to independently operate three hydraulic circuits. A first hydraulic circuit is configured to independently operate the first hydraulic motors 23 to independently drive the wheels 13 in order to propel the filling pipe 1 along the ground and provide steering capability for the filling pipe 1. A second hydraulic circuit operates the second hydraulic motors 24 to independently drive rotation of the caster wheel 50 to provide another steering capability for the filling pipe 1 A third hydraulic circuit operates the scissor linkage hydraulic cylinders 21 and the caster wheel hydraulic cylinder 33 to raise and lower the lower inlet end 6 and the elevated outlet end 4 of the elongated pipe 2. Alternatively, the third hydraulic circuit may only operate the scissor linkage hydraulic cylinders 21, and the drive system may comprise a fourth hydraulic circuit to independently operate the caster wheel hydraulic cylinder 33 from the scissor linkage hydraulic cylinders 21. Thus, one hydraulic drive system is able to independently drive the two wheels 13, rotate the caster wheel 50, drive the scissor linkage hydraulic cylinders 21 and drive the caster wheel hydraulic cylinder 33.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A self-propelled filling pipe for a liquid manure spreader, the self-propelled filling pipe comprising:
   a frame;
   an elongated pipe having a lower inlet end and an elevated outlet end, the elongated pipe mounted on the frame;
   at least two wheels mounted on the frame, the at least two wheels facilitating movement of the pipe on a ground surface;
   a caster wheel mounted on the elongated pipe proximate the lower inlet end;
   a fluid drive system comprising
      a hydraulic pump,
      a first hydraulic circuit connected to the hydraulic pump and a plurality of first hydraulic motors drivingly connected to the at least two wheels;
      a second hydraulic circuit connected to the hydraulic pump and at least one second hydraulic motor operatively connected to the caster wheel; and,
   a prime mover for providing power to the hydraulic pump to power the first and second hydraulic motors to: rotate the caster wheel thereby steering the filling pipe; and/or, drive the at least two wheels thereby propelling the filling pipe on the ground surface.

2. The self-propelled filling pipe according to claim 1, wherein the first hydraulic motors are independently controllable to independently drive each of the at least two wheels, and the filling pipe is steerable by differentially controlling the speed of the at least two wheels.

3. The self-propelled filling pipe according to claim 2, wherein the at least two wheels is two wheels, and the plurality of first hydraulic motors is two hydraulic wheel motors, one hydraulic wheel motor for each of the two wheels.

4. The self-propelled filling pipe according to claim 1, wherein the plurality of first hydraulic motors comprise disengagement structures for mechanically disengaging the plurality of first hydraulic motors from the at least two wheels.

5. The self-propelled filling pipe according to claim 4, wherein the plurality of first hydraulic motors comprise wheel output gears, the at least two wheels comprise wheel input gears connected to the at least two wheels, the wheel input gears having a larger diameter than the wheel output gears, the wheel output and wheel input gears meshing to drivingly connect the plurality of first hydraulic motors to the at least two wheels,
   and wherein the disengagement structures comprise slides attached to the plurality of first hydraulic motors, the slides translatable along portions of the frame to disengage the wheel output gears from the wheel input gears, the slides reversibly securable to the frame portions to secure the wheel output gears in an engaged position or a disengaged position.

6. The self-propelled filling pipe according to claim 4, wherein the plurality of first hydraulic motors comprise wheel output pulleys or sprockets, the at least two wheels comprise wheel input pulleys or sprockets connected to the at least two wheels, the wheel input pulleys or sprockets having a larger diameter than the wheel output pulleys or sprockets, the wheel output pulleys or sprockets and wheel input pulleys or sprockets connected by belts or chains to drivingly connect the plurality of first hydraulic motors to the at least two wheels, and wherein the disengagement structures comprise mechanical clutches.

7. The self-propelled filling pipe according to claim 6, wherein the mechanical clutches comprise over-center cams and levers for moving idler pulleys or sprockets into our out of engagement with the belts or chains to thereby tension or slacken the belts or chains to drivingly engage or disengage the plurality of first hydraulic motors from the at least two wheels.

8. The self-propelled filling pipe according to claim 1, wherein the drive system comprises a third hydraulic circuit connected to the hydraulic pump and at least one hydraulic cylinder, whereby operating the at least one hydraulic cylinder raises and lowers the outlet end of the elongated pipe.

9. The self-propelled filling pipe according to claim 8, wherein the at least one hydraulic cylinder comprises at least two hydraulic cylinders, at least one of the hydraulic cylinders operable to raise and lower the outlet end of the elongated pipe and at least one of the hydraulic cylinders operable to raise and lower the inlet end of the elongated pipe.

10. The self-propelled filling pipe according to claim 9, further comprising a mounting bracket attached to the elongated pipe proximate the lower inlet end, the caster wheel mounted on the mounting bracket by a pivotable linkage assembly, wherein the hydraulic cylinder operable to raise and lower the inlet end of the elongated pipe is pivotally connected to the mounting bracket and the linkage assembly whereby operation of the hydraulic cylinder pivots the linkage assembly on the bracket to raise and lower the lower inlet end when the caster wheel is on the ground surface.

11. The self-propelled filling pipe according to claim 8, wherein the frame comprises at least one scissor linkage, and the at least one hydraulic cylinder is mounted on the at least one scissor linkage, and wherein operating the at least one hydraulic cylinder drives the at least one scissor linkage to raise and lower the outlet end of the elongated pipe.

12. The self-propelled filling pipe according to claim 11, wherein the at least one scissor linkage is two scissor linkages, and the at least one hydraulic cylinder is two hydraulic cylinders, one hydraulic cylinder for each of the two scissor linkages.

13. The self-propelled filling pipe according to claim 1, wherein the caster wheel comprises a vertical shaft rotatably connecting the caster wheel proximate the lower inlet end of the elongated pipe and a caster input gear mounted on the vertical shaft, and wherein the at least one second hydraulic motor comprises a caster output gear meshing with the caster input gear to rotate the caster wheel on operation of the second hydraulic motor thereby steering the filling pipe.

14. The self-propelled filling pipe according to claim 1, further comprising a control unit for controlling the drive system.

15. The self-propelled filling pipe according to claim 1, wherein the prime mover comprises a combustion engine mounted on the frame.

* * * * *